US011190407B2

(12) United States Patent
Chamarajnager et al.

(10) Patent No.: US 11,190,407 B2
(45) Date of Patent: *Nov. 30, 2021

(54) INTERNET OF THINGS DEVICE DISCOVERY AND CONFIGURATION

(71) Applicant: VMware, Inc., Palo Alto, CA (US)

(72) Inventors: Ravishankar Chamarajnager, Atlanta, GA (US); Keerthana Parthasarathy, Bangalore (IN); Him Kalyan Bordoloi, Bellevue, WA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/161,874

(22) Filed: Jan. 29, 2021

(65) Prior Publication Data

US 2021/0152434 A1 May 20, 2021

Related U.S. Application Data

(63) Continuation of application No. 16/583,824, filed on Sep. 26, 2019, now Pat. No. 10,944,638.

(51) Int. Cl.
*H04L 12/24* (2006.01)
*H04L 12/66* (2006.01)

(52) U.S. Cl.
CPC .............. *H04L 41/12* (2013.01); *H04L 12/66* (2013.01); *H04L 41/0843* (2013.01)

(58) Field of Classification Search
None
See application file for complete search history.

(56) References Cited

U.S. PATENT DOCUMENTS

| 2008/0228908 | A1* | 9/2008 | Link .................. H04L 41/0853 709/223 |
| 2016/0359664 | A1* | 12/2016 | Malegaonkar ............ G06F 8/34 |
| 2017/0353859 | A1* | 12/2017 | Idnani .................. H04W 12/08 |
| 2018/0013867 | A1* | 1/2018 | Bhagwat ................. H04L 69/24 |
| 2018/0270079 | A1* | 9/2018 | Chamarajnager ..... H04L 67/125 |
| 2019/0230063 | A1* | 7/2019 | McCready ............ H04W 12/03 |
| 2019/0342179 | A1* | 11/2019 | Barnard ................. G06F 16/27 |
| 2019/0356542 | A1* | 11/2019 | Chamarajnager ... H04L 63/0823 |

* cited by examiner

*Primary Examiner* — June Y Sison

(74) *Attorney, Agent, or Firm* — Thomas Horstemeyer, LLP

(57) ABSTRACT

Disclosed are various examples for Internet of Things (IoT) device discovery and configuration. In some embodiments, a gateway receives a specified IoT protocol, and instructions for the gateway device to broadcast an IoT device discovery message. The gateway broadcasts the IoT device discovery beacon message, and IoT devices provide unique IoT device identifiers in response. A list of IoT devices is transmitted to the management service. The gateway device receives and implements a command to allow communications with the IoT devices.

20 Claims, 6 Drawing Sheets

INTERNET OF THINGS DEVICE DISCOVERY AND CONFIGURATION

CROSS-REFERENCE TO RELATED APPLICATIONS

This application is a continuation of, and claims priority to and the benefit of, U.S. application Ser. No. 16/583,824, entitled "Internet of Things Device Discovery and Configuration," filed on Sep. 26, 2019, which is hereby incorporated by reference in its entirety.

BACKGROUND

Appliances, vehicles, sensors, controllers, actuators, and other devices can gather data and interact with the physical world. This network of devices or Internet-of-Things (IoT) can be utilized to improve operations and provide new services. In order to ensure the security and reliability of IoT device connections in an enterprise setting, the enterprise can utilize a management service capable of protecting IoT device data, as well as email, corporate documents, and other enterprise data from theft, data loss, and unauthorized access. In order to access a network, IoT devices can connect through a gateway or another edge device.

Client devices, edge devices, IoT devices, and other devices can be required to enroll with the management service in order to ensure securely authorized management communications. However, IoT discovery and configuration can be costly in time and effort in an enterprise environment that includes multiple IoT devices. Different IoT devices can have different hardware configurations, operating systems, and software configurations. In addition, general authentication can require a user name or user account, which may not be applicable to IoT devices. Manually onboarding these disparate devices can cause delays and lost efficiency in the onboarding process.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to Internet-of-Things (IoT) device discovery and configuration. The IoT device, once discovered, can be configured and enrolled for management by the management service. In order to provide data and interact with the physical world, IoT devices can connect to a network through a gateway or another edge device. Manual individual configuration of IoT devices can be complex, slow, and cause inefficiency in an enterprise environment. However, the present disclosure describes systems and methods that can improve the efficiency of IoT discovery and configuration.

Figure 1:
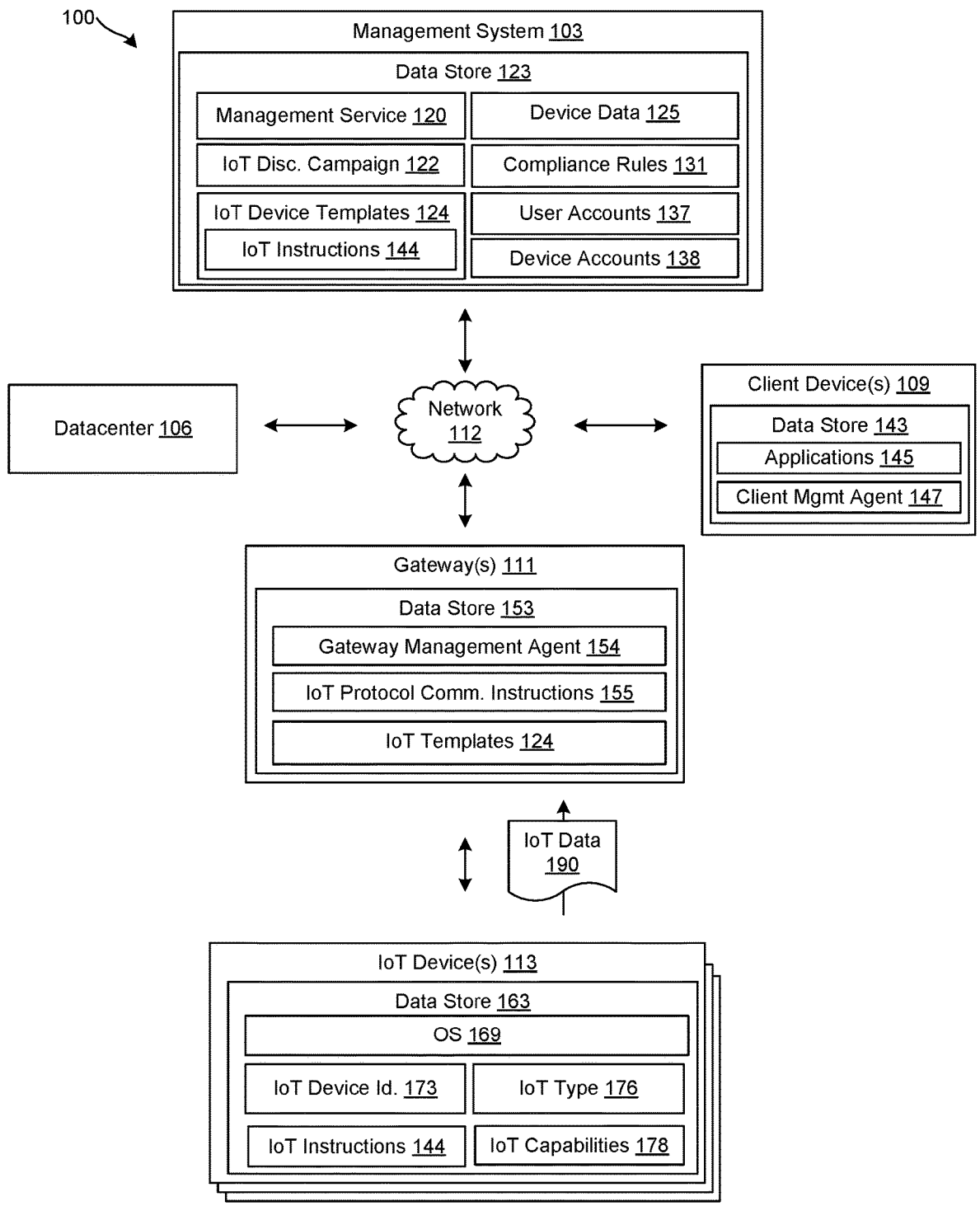
FIG. 1 is a drawing of an example of a networked environment that includes elements involved in onboarding a gateway.

With reference to FIG. 1, shown is an example of a networked environment 100. The networked environment 100 can include a management system 103, a datacenter 106, a client device 109, a gateway 111, Internet-of-Things (IoT) devices 113, and other components in communication with one another over a network 112. In some cases, IoT devices 113 and other devices can connect to the network 112 through the gateway 111. The components of the networked environment 100 can be utilized to discover and configure IoT devices 113 for management by the management service 120. Discovery and configuration can include providing gateways 111 with IoT protocol communication instructions 155, which enable the gateways 111 to communicate with IoT devices 113 that utilize a particular IoT protocol. IoT protocols can include BacNet, Profinet, Profibus, LoraWAN, ZigBee, ZWave, MQTT, CoAP, and others. The discovery and configuration process can also include identifying IoT devices 113 that connect through the gateways 111, and providing gateways 111 with IoT templates 124 that govern operation and configuration of the IoT devices 113.

The network 112 can include the Internet, intranets, extranets, wide area networks (WANs), local area networks (LANs), wired networks, wireless networks, other suitable networks, or any combination of two or more such networks. The networks can include satellite networks, cable networks, Ethernet networks, telephony networks, and other types of networks.

The management system 103 can include a server computer or any other system providing computing capability. While referred to in the singular, the management system 103 can include a plurality of computing devices that are arranged in one or more server banks, computer banks, or other arrangements. The management system 103 can include a grid computing resource or any other distributed computing arrangement. The management system 103 can be customer or enterprise-specific. The computing devices of the management system 103 can be located in a single installation or can be distributed among many different geographical locations local and/or remote from the other components. The management system 103 can also include or be operated as one or more virtualized computer instances. For purposes of convenience, the management system 103 is referred to herein in the singular. Even though the management system 103 is referred to in the singular, it is understood that a plurality of management systems 103 can be employed in the various arrangements as described above.

The components executed on the management system 103 can include a management service 120, as well as other applications, services, processes, systems, engines, or functionality not discussed in detail herein. The management service 120 can be stored in the data store 123 of the management system 103. While referred to generally as the management service 120 herein, the various functionalities and operations discussed can be provided by the management service 120 or any of its components.

The data store 123 can include any storage device or medium that can contain, store, or maintain the instructions, logic, or applications described herein for use by or in connection with the instruction execution system. The data store 123 can be a hard drive or disk of a host, server computer, or any other system providing storage capability. While referred to in the singular, the data store 123 can include a plurality of storage devices that are arranged in one or more hosts, server banks, computer banks, or other arrangements. The data store 123 can include any one of many physical media, such as magnetic, optical, or semiconductor media. More specific examples include solid-state drives or flash memory. The data store 123 can include memory of the management system 103, mass storage resources of the management system 103, or any other storage resources on which data can be stored by the management system 103. The data stored in the data store 123 can include, for example, management data including IoT discovery campaigns 122, IoT templates 124, device data 125, enterprise data, compliance rules 131, user accounts 137, and device accounts 138, as well as other data. The IoT templates 124 can include IoT instructions 144 that govern the implementation of IoT capabilities 178 of an IoT device 113.

An IoT discovery campaign 122 can identify a subset of the gateways 111, and IoT protocol communication instructions 155 for a particular IoT protocol. In some cases, the IoT discovery campaign 122 can identify IoT templates 124 to associate with IoT devices 113.

The IoT templates 124 can include IoT instructions 144 for IoT devices 113. The IoT templates 124 can also identify an IoT device type with which the IoT template 124 can be associated. The identified IoT device type can be associated with an IoT device 113 that includes IoT capabilities 178 that can perform the IoT instructions 144. The IoT type 176 can include a vendor identifier and a model identifier of the IoT device 113. The IoT type 176 can be associated with a general category of the IoT device 113 such as thermostat, light, light switch, and so on. The management service 120 can include a registry of IoT type 176 that associates each IoT type 176 (e.g., vendor identifier and model identifier) in association with a descriptive IoT category identifier.

Device data 125 can identify client devices 109, gateways 111, and IoT devices 113 by one or more of a device identifier, a unique device identifier (UDID), a media access control (MAC) address, an internet protocol (IP) address, or another identifier that uniquely identifies a device with respect to other devices. The device identifier of an IoT device 113 can include the IoT device identifier 173. The device data 125 can include an enrollment status indicating whether each client device 109, gateway 111, or IoT device 113 is enrolled with or managed by the management service 120. A client device 109, gateway 111, or IoT device 113 designated as "enrolled" can be permitted to access the enterprise data, while a client device 109, gateway 111, or IoT device 113 designated as "not enrolled," or having no designation, can be denied access to the enterprise data. In some cases, the enrollment of an IoT device 113 can include registering the IoT device 113 with the management service 120. This registration can include storing a device account 138 that includes an IoT type 176, an IoT device identifier 173, and IoT capabilities 178 that can be performed by the IoT device 113. Enrollment can indicate that an administrative user has authorized the IoT device 113 to communicate with the management service 120. Enrollment can also indicate that the gateway 111 has been provided with instructions to permit the IoT device 113 to access the network 112 and the management service 120 through the gateway 111. In some cases, enrollment of the IoT device 113 can include installation of a profile that enforces compliance rules 131 on the IoT device 113.

The device data 125 can include indications of the state of devices including the client devices 109, gateways 111, and IoT devices 113. For instance, these indications can specify applications that are installed on the client devices 109, gateways 111, and IoT devices 113, configurations or settings that are applied to each of the devices, user accounts 137, device accounts 138, or service accounts associated with each of the devices, the physical locations of each of the devices, the network to which each of the devices is connected, and other information describing the current state of each of the devices. While a user account 137 can be associated with a particular person, a device account 13 can be unassociated with any particular person, and can nevertheless be utilized for client devices 109, gateways 111, or IoT devices 113 that provide certain functionalities, such as automatic functionalities. For example, the IoT device 113 can be associated with a service account or a device account 138 that is user unassociated, or not associated with any person. Each of the gateways 111 can be enrolled with the management service 120, and can be associated with a respective device account 138, such as a gateway account. A device account 138 for a gateway 111 can be referred to as a gateway account. Likewise, each of the IoT devices 113 can be enrolled with the management service 120, and can be associated with a respective device account 138. A device account 138 for an IoT device 113 can be referred to as an IoT device account.

Device data 125 can also include data pertaining to user groups. An administrator can specify one or more of the client devices 109, gateways 111, and IoT devices 113 as belonging to a user group. The user group can refer to a group of user accounts 137, which can include device accounts 138. User groups can be created by an administrator of the management service 120 such that a batch of client devices 109, gateways 111, and/or IoT devices 113 can be configured according to common settings. For instance, an enterprise can create a user group for the marketing department and the sales department, where client devices 109, gateways 111, and/or IoT devices 113 in the marketing department are configured differently from the client devices 109, gateways 111, and/or IoT devices 113 in the sales department.

The device data 125 can include device specifications and IoT instructions 144 for each IoT device 113. The device specifications can be provided by the IoT device 113 in response to one or more beacon or message broadcast on the network 112 by the gateway 111. The message can be broadcast or otherwise transmitted so that is available to all IoT devices 113 that connect through the gateway 111. Device specifications can include a type or category of the IoT device 113, an IoT device identifier 173, an IoT type 176, and a list of device-supported IoT capabilities 178. Specifications for the IoT device 113 can include hardware configurations including a chipset utilized by the device, a performance or capacity, a model identifier, and software configurations, including applications installed on the IoT device 113. Specifications of the IoT device 113 can also include an operating system 169 and a version of the operating system 169.

Compliance rules 131 can include, for example, configurable criteria that must be satisfied for an enrolled one of the client devices 109, gateways 111, and IoT devices 113 to be in compliance with the management service 120. The compliance rules 131 can be based on a number of factors, including geographical location, activation status, enrollment status, and authentication data including authentication data obtained by a device registration system, time, and date, and network properties, among other factors associated with each device. The compliance rules can also be determined based on a user account 137 associated with a user. In some cases, a gateway 111 can be unassociated with a user, but can nevertheless be associated with a service account, a device account 138, or another user account 137 that is unassociated with a user.

Compliance rules 131 can include predefined constraints that must be met in order for the management service 120, or other applications, to permit client devices 109 and IoT devices 113 with access to enterprise data and other functions of the management service, as well as connectivity through the gateway 111. The management service 120 can communicate with gateway management agent 154 to determine whether states exist on the gateway 111 that do not satisfy one or more compliance rules 131. States can include, for example, a virus or malware being detected on the device; installation or execution of a blacklisted application; and/or a device being "rooted" or "jailbroken," where root access is provided to a user of the device. Additional states can include the presence of particular files, questionable device configurations, vulnerable versions of applications, vulnerable states of IoT devices 113 or other vulnerability, as can be appreciated.

The management service 120 can communicate with the gateway to determine whether states exist that do not satisfy one or more compliance rules 131 regarding the gateway 111 and IoT devices 113. The IoT device 113 can transmit IoT data 190, such as sensor data or status data to an upstream target, such as an endpoint of the management service 120 or the datacenter 106. The datacenter 106 can be part of the management system 103, or can be separate from the management system 103. The endpoint can be an IP address, a URL, or other network address identifier. In some cases, the gateway 111 can receive IoT device 113 communications. The gateway 111 can pass or otherwise transmit the IoT data 190 to the management service 120. IoT device 113 can also transmit status data to the management service 120 for evaluation of compliance rules. In some cases, the management service 120 can transmit all or a portion of the compliance rules 131 to the gateway 111. The gateway 111 can determine or evaluate whether states exist, for example on the IoT devices 113, that do not satisfy one or more compliance rules 131, for example, without passing or transmitting the status data to the management service 120. In any case, determining that states exist in the IoT device 113 that do not satisfy one or more compliance rules 131 can trigger transmission of an action or command that causes the IoT device 113 to be in compliance with the compliance rules 131.

The management service 120 can oversee the management of devices including the client devices 109, gateways 111, and IoT devices 113. The management service 120 can oversee the operation of the devices enrolled with the management service 120 as well as enrollment and un-enrollment operations for the devices, for example, using the management service 120. The management service 120 can provide functionality using application program interfaces (APIs). To this end, an API of the management service 120 can provide enrollment information regarding a device, such as whether the device is enrolled with the management service 120. APIs or API calls can be provided for other functionalities of the management service 120 as discussed herein.

The management service 120 can transmit, to the gateway 111, IoT templates 124, including IoT instructions 144. The gateway 111 can install, configure, or implement the IoT template 124 to control operation of the IoT device 113. In some cases, the IoT device 113 can include an IoT capability 178 to sense or collect a particular metric such as temperature, humidity, barometric pressure, or other metrics. The IoT template 124 can indicate to collect the particular metric periodically based on a specified period, or based on a specified schedule. The gateway 111 can refer to the IoT template 124, and transmit a request for the metric periodically or on the specified schedule in order to retrieve the metric. In some cases, the gateway 111 can transmit the IoT instructions 144 to the IoT device 113 so that the IoT device 113 automatically provides the metric according to the specified period or schedule.

In some cases, the IoT device 113 can include an IoT capability 178 to perform an action such as setting an on/off state of a light or other electronic device, setting a thermostat temperature, setting a lighting level, or locking/unlocking a lock device. The IoT template 124 can specify IoT instructions 144 to perform a particular action periodically or based on a specified schedule. The gateway 111 can refer to the IoT template 124, and transmit a request or command for the IoT device 113 to perform the action periodically or on the specified schedule. In some cases, the gateway 111 can transmit IoT instructions 144 to the IoT device 113 so that the IoT device 113 automatically performs the action periodically or based on a specified schedule.

The management service 120 can further cause policies and compliance rules 131 to be implemented on an IoT device 113. Policies can include, for example, restrictions or permissions pertaining to capabilities or IoT capabilities 178 of the IoT device 113. For instance, policies can require certain hardware or software functions of the IoT device 113 to be enabled or be disabled during a certain time period or based on a particular location. Policies can require IoT data 190 to be transmitted by the IoT device 113 to be proxied through a particular endpoint of the management service 120. Policies can be implemented by the IoT management process 165. In some cases, the installation or implementation of an enrollment policy can complete an enrollment of the IoT device 113 with the management service 120. In some cases, the gateway 111 can implement the policies by commands or requests transmitted from the gateway 111 to the IoT device 113. In other examples, an IoT management agent can be installed on the IoT device 113, and the IoT management agent can enforce the policies or compliance rules 131. In some cases, installation of an enrollment policy can complete an enrollment of the IoT device 113. The management service 120 can also transmit various software components to the IoT device 113 which are then installed, configured, or implemented by an IoT management agent. Such software components can include, for example, applications, resources, libraries, drivers, device configurations, or other similar components that require installation on the IoT device 113 as specified by an administrator of the management service 120. The management service 120 can further cause policies to be implemented on the IoT device 113. Policies can include, for example, restrictions or permissions pertaining to capabilities of an IoT device 113. For instance, policies can require certain hardware or software functions of the IoT device 113 to be enabled or be disabled during a certain time period or when the IoT device 113 is physically located at a particular location.

The management service 120 can transmit various software components to the client device 109 which are then installed, configured, or implemented by the client management agent 147. Such software components can include, for example, additional applications 145, resources, libraries, drivers, device configurations, or other similar components that require installation on the client device 109 as specified by an administrator of the management service 120. The management service 120 can further cause policies to be implemented on a client device 109. Policies can include, for example, restrictions or permissions pertaining to capabilities of a client device 109. For instance, policies can require certain hardware or software functions of the client device 109 to be enabled or be disabled during a certain time period or when the client device 109 is physically located at a particular location. Such policies can be implemented by the client management agent 147.

The management service 120 can transmit commands, requests, and IoT instructions 144 to the IoT device 113 through the gateway 111. The management service 120 can have a command queue storing at least one action to perform on the particular gateway 111 upon check-in of the gateway 111. For instance, the gateway management agent 154 can cause the gateway 111 to check-in with the management service 120, identify an action in the command queue, and perform or implement the action. An action can be the installation of a profile, or the execution of a command or other actions to install software components, implement IoT instructions 144, update the gateway management agent 154, or implement other commands. In some cases, the gateway management agent 154 can cause a check-in of the gateway 111 periodically, on a schedule, or upon an event, such as changing a state of the gateway 111, installing an application on the gateway 111, upon detecting an IoT device 113, or upon receiving a request to access the network 112 or another request from an IoT device 113.

In one example, the contents of the command queue can include a command to associate a particular IoT device 113 with a particular IoT template 124. The command can include the IoT template 124 and associated IoT instructions 144. In another example, the contents of the command queue can include a resource, such as IoT protocol communication instructions 155, for the gateway management agent 154 to install on the gateway 111. The gateway 111 can access the resource through a specified uniform resource locator (URL) provided in the command. A client device 109 can likewise be associated with a command queue and can retrieve and implement commands.

The management service 120 can also request that the gateway 111 or client device 109 check-in using a notification service like APPLE® Push Notification Service (APNS), GOOGLE® Cloud Messaging (GCM), WINDOWS® Push Notification Services (WNS), or AirWatch® Cloud Messaging (AWCM). For example, the management service 120 can transmit a request to the notification service, which requests that the gateway 111 check-in with the management service 120. The notification service can push or otherwise route a notification to the gateway 111. Once the notification is received, the gateway management agent 154 can cause the gateway 111 to check-in with the management service 120. The gateway management agent 154 can determine whether a command queue provided by the management service 120 for the respective gateway 111 contains any commands or resources for the gateway 111, and, if so, can cause the commands or resources to be downloaded and/or implemented on the gateway 111. A client device 109 can likewise be associated with a command queue and can retrieve and implement commands in response to a request from a notification service.

The IoT data 190 can include a stream of at least one tuple including a number and a time stamp. The IoT data 190 can include a sampling function which is a user defined method (udm), a sampling frequency stating the interval between subsequent executions of the udm, and an aggregation count stating how many executions of the udm to aggregate before sending the IoT data 190 to the management service 120. The IoT data 190 can include SI units and a prefix that identifies what the numbers of the stream of IoT data 190 represent. A user interface can be generated based at least in part on the IoT data 190.

The client device 109 can be representative of one or more client devices 109. The client device 109 can include a processor-based system, such as a computer system, that can include a desktop computer, a laptop computer, a personal digital assistant, a cellular telephone, a smartphone, a set-top step, a music player, a tablet computer system, a game console, an electronic book reader, a smartwatch, or any other device with like capability. The client device 109 can have an operating system that can perform functionalities and execute applications. The operating system can be stored in a data store 143 that also includes applications 145, a client management agent 147, and other data. The client device 109 can execute the client management agent 147 to perform or access the functionality described for the management service 120.

The client device 109 can also be equipped with networking capability or networking interfaces, including a localized networking or communication capability, such as a near-field communication (NFC) capability, radio-frequency identification (RFID) read or write capability, or other localized communication capability. In some embodiments, the client device 109 is mobile where the client device 109 is easily portable from one location to another, such as a smart phone, tablet, or laptop computer. In other situations, the client device 109 can be a desktop machine or a kiosk that is not easily portable.

The operating system of the client device 109 can be configured to execute various applications 145, such as a client management agent 147, a browser application, or another application. The operating system and some applications 145 can access network content served up by the management system 103, or other servers, thereby rendering a user interface on a display, such as a liquid crystal display (LCD), organic light emitting diode (OLED) display, touch-screen display, or other type of display device.

To this end, some applications 145 can include a browser or a dedicated application, and a user interface can include a network page, an application screen, or other interface. The client device 109 can also access web applications using the browser application. Further, other applications 145 can include device management applications, enterprise applications, social networking applications, word processors, spreadsheet applications, media player applications, or other applications. The client management agent 147 can perform actions as directed by the management service 120, for instance, by checking in with the management service 120, retrieving a command from the command queue, and implementing the command as discussed above.

The gateway 111 can be representative of one or more gateways 111. While referred to as a gateway, the gateway 111 can also be representative of routing switches, integrated access devices (IADs), multiplexers, a variety of metropolitan area network (MAN) and wide area network (WAN) access devices, and other edge devices. The gateway 111 can execute gateway management agent 154 and other applications and modules stored in the data store 153. The gateway management agent 154 can perform management functionalities including enrollment functionalities, product and application installations, and profile installations. These functionalities can include a number of modules or components that perform actions through the gateway 111, and the gateway management instructions can be updated, upgraded, or otherwise altered throughout the lifecycle of the gateway 111.

The IoT devices 113 can be appliances, vehicles, sensors, controllers, actuators, and other physical devices including at least: a processor, network communication hardware, and a memory including executable instructions for communicating with a gateway 111. The IoT device 113 can be representative of one or more IoT devices 113. The IoT device 113 can include appliances, vehicles, sensors, controllers, actuators, monitors, phones, tablets, thermostats, speakers, screen boards, kiosks, and other devices and can incorporate processor-based systems, such as a computer system or any other device with like capability. The IoT device 113 can, in some examples, include a headless device without a graphical user interface. Such a headless device can have inputs and outputs through other interfaces like network or serial ports. An IoT device 113 can include an ad board, information board, or other screen board that provides a graphical display but generally does not provide for user interaction with the graphical display and rejects access to system functions. In further cases, an IoT device 113 can include a kiosk or interactive graphical user interface that is locked into a defined functionality and rejects access to system functions. The IoT device 113 can have an operating system or other software that can perform functionalities and execute applications. The operating system can be stored in a data store 163. The IoT device 113 can execute the IoT management process 165 to perform or access the functionality described for the management service 120.

The IoT device 113 can also be equipped with networking capability or networking interfaces, including a localized networking or communication capability, such as a near-field communication (NFC) capability, radio-frequency identification (RFID) read or write capability, or other localized communication capability. In some embodiments, the IoT device 113 is mobile where the IoT device 113 is easily portable from one location to another. In other situations, the IoT device 113 can be a thermostat, fixture, or other device that is not easily portable. The IoT device identifier 173 can include a manufacturer-assigned serial number or a unique device activation identifier generated by the management service 120. The IoT type 176 can include a unique vendor identifier provided by a manufacturer or vendor of the IoT device 113, or a name of the manufacturer or vendor of the IoT device 113.

Figure 2:
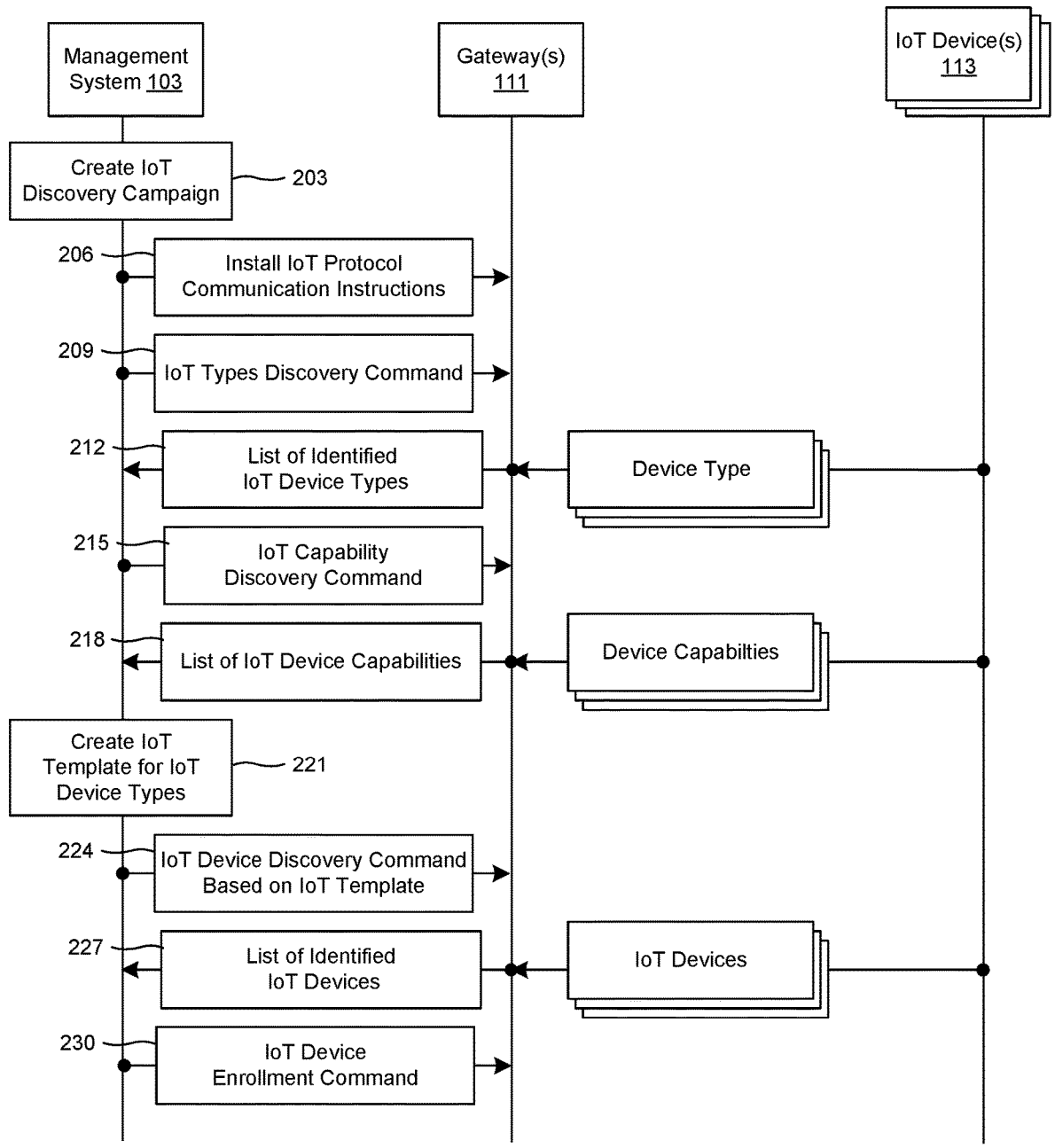
FIG. 2 is a sequence diagram illustrating functionality implemented by components of the networked environment.

FIG. 2 shows a sequence diagram that illustrates steps performed by components of the networked environment 100. Generally, this sequence enables the management system 103 to coordinate with gateways 111 to discover, configure, and enroll IoT devices 113 that are connected through the gateways 111. The management service 120 can then control and manage the enrolled IoT devices 113.

In step 203, the management service 120 can create an IoT discovery campaign 122. For example, the management service 120 can generate a management console or another user interface that enables a user to design the IoT discovery campaign 122. The user interface can identify a user selection of a user interface element that initiates creation of the IoT discovery campaign 122. The management service can provide a user interface element through which aspects of the IoT discovery campaign 122 can be designed, including a name and description of the IoT discovery campaign 122. A specified subset of the gateways 111 can also be selected based on keyword, gateway model, building, floor of a building, or other parameters. A user can also specify an IoT protocol for the IoT discovery campaign 122. The IoT discovery campaign 122 can also include a number of commands such as commands to install IoT protocol communication instructions 155, and IoT discovery commands. IoT discovery commands can include an IoT type discovery command, an IoT capability discovery command, and IoT device discovery command. Each IoT discovery command can include instructions for the gateway management agent 154 to communicate with connected IoT devices 113.

In step 206, the management service 120 can transmit a command to install IoT protocol communication instructions 155 to a gateway 111. The gateway 111 can be one of a subset of gateways 111 identified in the IoT discovery campaign 122. The IoT discovery campaign 122 can specify the IoT protocol communication instructions 155 and a URL or other network address to download the IoT protocol communication instructions 155. The IoT protocol communication instructions 155 can enable to the gateways 111 to communicate using the IoT protocol specified by the IoT discovery campaign 122. The gateway management agent 154 can retrieve and install the IoT protocol communication instructions 155 on the gateway 111.

In step 209, the management service 120 can transmit an IoT type discovery command. The management service 120 can transmit the IoT type discovery command to the subset of the gateways 111 identified in the IoT discovery campaign 122. The IoT type discovery command can instruct the gateway 111 to identify IoT types 176 of IoT devices 113 connected to the gateway 111, for example, on a particular subnetwork.

In step 212, the gateway management agent 154 can transmit a list of IoT device types to the management service 120. The IoT type discovery command can cause the gateway 111 to broadcast a message using an IoT protocol specified in the IoT type discovery command. The broadcast message can be an IoT type discovery message or another message that the IoT devices 113 respond to by providing their IoT capabilities 178. The IoT type 176 can include a vendor identifier and a model identifier of the IoT device 113. In some examples, the IoT device 113 provides additional information in response to the broadcast message. The IoT type discovery command can cause the gateway management agent 154 to generate a list, table, or other data structure that includes the IoT types 176 of IoT devices 113 of a subnetwork connected to the gateway 111. The gateway management agent 154 can transmit the list of IoT types 176 to the management service 120.

In step 215, the management service 120 can transmit an IoT capability discovery command to the subset of the gateways 111 identified in the IoT discovery campaign 122. For example, the management service 120 can place the IoT capability discovery command in the command queues for the subset of the gateways 111, and can transmit the IoT capability discovery command on check in by the gateways 111. The IoT capability discovery command can instruct the gateway 111 to identify IoT capabilities 178 of IoT devices 113 connected to the gateway 111, for example, on a particular subnetwork.

In step 218, the gateway management agent 154 can transmit a list of IoT device capabilities to the management service 120. The IoT capability discovery command can cause the gateway 111 to broadcast a message in an IoT protocol specified in the IoT capability discovery command. The broadcast message can be an IoT capability discovery message that the IoT devices 113 respond to by providing their IoT capabilities 178. In some examples, the IoT device 113 provides additional information in response to the broadcast message. The IoT capabilities 178 can include a list of capabilities corresponding to the IoT type 176. In some examples, rather than a broadcast message, the gateway management agent 154 can identify connected IoT devices 113 that correspond to an IoT type 176 or IoT template 124 specified in the IoT capability discovery command, and can transmit individual IoT capability requests to these IoT devices 113 using the IoT protocol communication instructions 155 for a particular IoT protocol. The IoT devices 113 can respond by transmitting their IoT capabilities 178 to the gateway 111. The IoT capability discovery command can cause the gateway management agent 154 to generate a list, table, or other data structure that includes the IoT capabilities 178 of IoT devices 113 of a subnetwork connected to the gateway 111. The gateway management agent 154 can transmit the list of IoT capabilities 178 to the management service 120.

In step 221, the management service 120 can create an IoT template 124. The IoT template 124 can be automatically generated for an IoT type 176 based on the IoT capabilities 178 of the IoT type 176. The IoT template 124 can also indicate an IoT protocol. The IoT template 124 for an IoT type 176 can initially include a predetermined metric collection schedule or period generally associated with the collection of any metric. However, a user can enter or select a desired schedule or period for each capability, including each metric collectable and each action performable by the IoT type 176. The capabilities included in the IoT template 124 can be the verified capabilities in the verified list of IoT capabilities 178. The IoT template 124 can be transmitted to the gateway 111 that has IoT devices 113 of that IoT type 176 connected. In this way, the gateway 111 can automatically instruct corresponding IoT devices 113 to implement behaviors according to the IoT template 124. The IoT template 124 can include IoT instructions 144 that govern the operation of IoT devices 113 corresponding to the IoT type 176 of the IoT template 124.

In step 224, the management service 120 can transmit an IoT device discovery command to the subset of the gateways 111 identified in the IoT discovery campaign 122. For example, the management service 120 can place the IoT device discovery command in the command queues for the subset of the gateways 111, and can transmit the IoT device discovery command on check in by the gateways 111. The IoT device discovery command can instruct the gateway 111 to identify IoT devices 113 connected to the gateway 111, for example, on a particular subnetwork. Each IoT device 113 can be identified according to a unique IoT device identifier 173. The IoT device discovery command can include the IoT template 124 and instructions for the respective gateway to transmit an IoT device discovery message using the IoT protocol. The IoT template 124 can be a parameter of the IoT device discovery command, or can be otherwise included with the IoT device discovery command.

In step 227, the gateway management agent 154 can transmit a list of identified IoT devices to the management service 120. The IoT device discovery command can cause the gateway 111 to broadcast a message in an IoT protocol specified in the IoT device discovery command. The broadcast message can be an IoT device discovery message that the IoT devices 113 respond to by providing their IoT device identifiers 173. In some examples, the IoT device 113 provides additional information in response to the broadcast message. In some examples, rather than a broadcast message, the gateway management agent 154 can identify connected IoT devices 113 that correspond to an IoT type 176 or IoT template 124 specified in the IoT device discovery command, and transmit individual IoT capability requests to these IoT devices 113 using the IoT protocol communication instructions 155 for a particular IoT protocol. The IoT devices 113 can respond by transmitting their IoT device identifiers 173 to the gateway 111. The IoT device discovery command can cause the gateway management agent 154 to generate a list, table, or other data structure that includes the IoT device identifiers 173 of IoT devices 113 of a subnetwork connected to the gateway 111. The IoT devices 113 can correspond to the IoT protocol and the IoT type 176. The gateway management agent 154 can remove from the list IoT devices 113 that correspond to the IoT protocol but do not correspond to the IoT type 176. The gateway management agent 154 can transmit the list of IoT devices 113 to the management service 120.

In step 230, the management service 120 can transmit an IoT device enrollment command to the gateway 111. The management service 120 can generate a user interface that shows a sortable list of IoT devices 113, which includes and can be sorted according to IoT device name, IoT type 176, IoT template 124, enrollment status, and IoT device identifier 173. The user interface of the management service 120 can also include a user interface element to select an IoT device 113, and a user interface element that when activated, enrolls the IoT device 113 with the management service 120. For example, the management service 120 can, in response to activation of an enrollment interface element, transmit the IoT device enrollment command to the gateway 111 or place the command in the command queue of the gateway 111 through which the IoT device 113 is connected.

Figure 3:
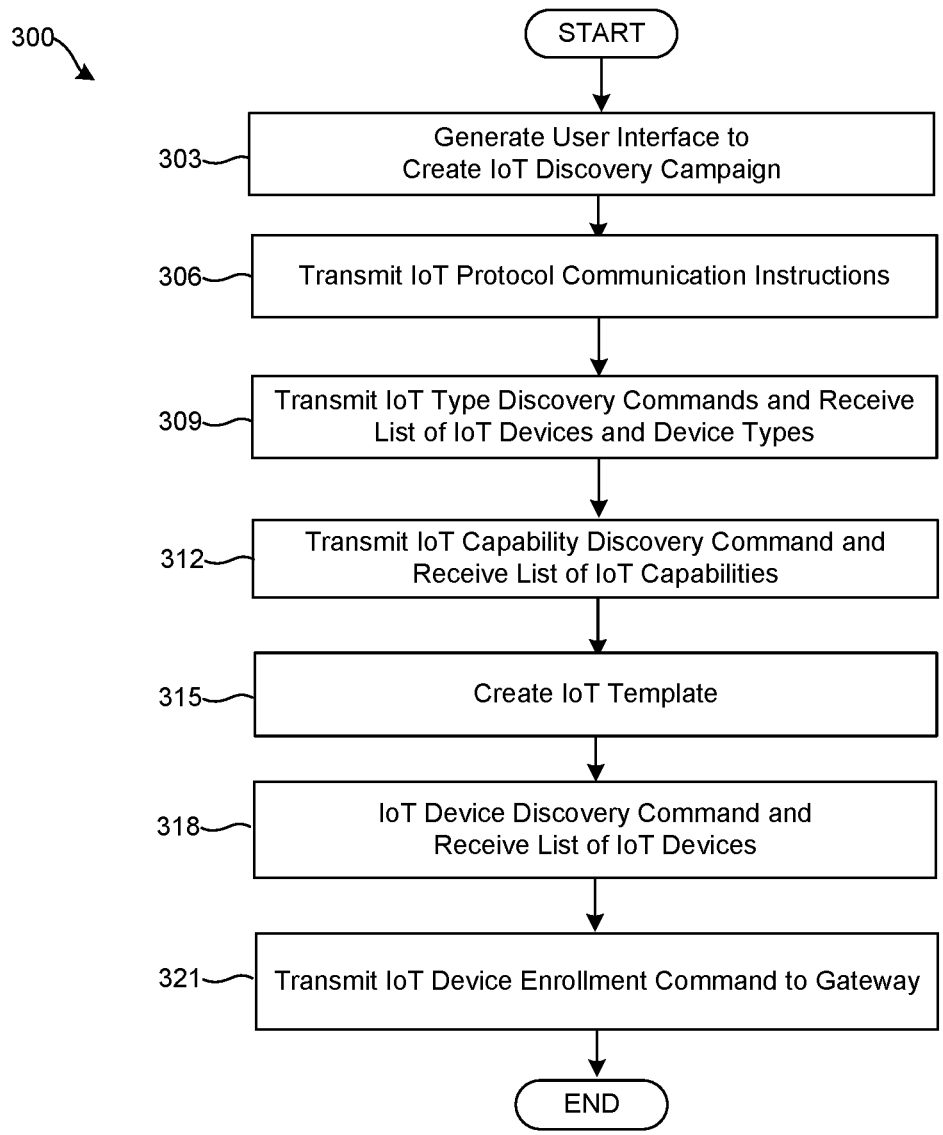
FIG. 3 is a flowchart illustrating functionality implemented by components of the networked environment.

FIG. 3 shows a flowchart 300 that illustrates an example of the operation of the management service 120. Flowchart 300 illustrates how the management service 120 coordinates with gateways 111 for discovery, configuration, and enrollment of IoT devices 113 connected to the gateways 111.

In step 303, the management service 120 can generate a user interface to create an IoT discovery campaign 122. For example, the management service 120 can generate a user interface that enables a user to design the IoT discovery campaign 122. The user interface can identify a user selection of a user interface element that initiates creation of the IoT discovery campaign 122. The user interface can be updated to include a user interface element through which a name or identifier of the IoT discovery campaign 122 can be entered. The user interface can also include a user interface element through which a description of the IoT discovery campaign 122 can be entered.

The management service 120 can access a list of gateways 111 that are enrolled with the management service 120. The management service 120 can provide a user interface that enables a user to select a subset of the gateways 111. The selected gateways 111 can be specified in the IoT discovery campaign 122, and can receive commands and requests specified by the IoT discovery campaign 122. The user interface can provide a user interface element that filters the gateways 111 based on a key value pair and an operator. The key, the value, and the operator can be selected. The keys can indicate a type of filtering parameter such as filtering according to a user group, a model, a vendor, a type, a keyword, or a campaign state indicated in the gateway account data for the gateways 111. The operator can include exact match, contains, starts with, ends with, or other operators. The management service 120 can identify the subset of the gateways 111 using the key value pair and the operator can include the subset of the gateways 111 in the IoT discovery campaign 122. For example, if the selected key is "keyword," the value is "Atlanta," and the operator is "contains," then the management service 120 can determine that the device account 138 of a gateway 111 includes the keyword "Atlanta," for example, in a description of the gateway. In another example, if the selected key is "user group," the value is "Floor 2," and the operator is "exact match," then the management service 120 can determine that the device account 138 of a gateway 111 indicates that a user group identifier of the gateway 111 is "Floor 2." The management service 120 can include the gateway 111 in the subset of the gateways 111 in the IoT discovery campaign 122.

The user interface of the management service 120 can also provide a user interface element to select or enter an IoT protocol for the IoT discovery campaign 122. The IoT protocol can be a protocol used by IoT devices 113 for communications. IoT protocols can include BacNet, Profinet, Profibus, LoraWAN, ZigBee, ZWave, MQTT, CoAP, and others. The user interface can provide a drop down menu or another listing of available IoT protocols, for example, supported IoT protocols or those for which IoT protocol communication instructions 155 are available to the management service 120. IoT protocol communication instructions 155 can be available to the management service 120 in the data store 123, or through a known URL or other network address. The user interface can provide a user interface element through which a new IoT protocol identifier for an IoT protocol can be entered. The user interface can also include a user interface element through which new IoT protocol communication instructions 155 can be uploaded, or a URL or other network address for the new IoT protocol communication instructions 155 can be provided. These items can be included or specified in the IoT discovery campaign 122. The IoT discovery campaign 122 can also include a number of commands such as commands to install IoT protocol communication instructions 155, commands to perform an IoT type discovery, IoT capability discovery, and IoT device discovery.

In step 306, the management service 120 can transmit a command to install IoT protocol communication instructions 155 to a gateway 111. The gateway 111 can be one of a subset of gateways 111 identified in the IoT discovery campaign 122. The management service 120 can transmit the command to install the IoT protocol communication instructions 155 to each of the gateways 111 identified in the IoT discovery campaign 122. The IoT discovery campaign 122 can specify the IoT protocol communication instructions 155 and a URL or other network address to download the IoT protocol communication instructions 155. The IoT protocol communication instructions 155 can enable to the gateways 111 to communicate using the IoT protocol specified by the IoT discovery campaign 122.

The management service 120 can provide a command queue for each gateway 111. The management service 120 can place commands in the command queue. Transmitting the command to install IoT protocol communication instructions 155 to a gateway 111 can include the gateway 111 checking in with the management service 120 to request or retrieve commands from the command queue. The gateway management agent 154 can implement the retrieved command using the gateway 111. The management service 120 can transmit the command to install IoT protocol communication instructions 155 to a gateway 111.

In step 309, the management service 120 can transmit an IoT type discovery command. The management service 120 can transmit the IoT type discovery command to the subset of the gateways 111 identified in the IoT discovery campaign 122. For example, the management service 120 can place the IoT type discovery command in the command queues for the subset of the gateways 111, and can transmit the IoT type discovery command upon check-in by the gateways 111. The IoT type discovery command can instruct the gateway 111 to identify IoT types 176 of IoT devices 113 connected to the gateway 111, for example, on a particular subnetwork. Each gateway 111 can carry out the IoT type discovery commands and return a list of IoT types of IoT devices 113 connected to the respective gateway 111.

In step 312, the management service 120 can transmit an IoT capability discovery command to the subset of the gateways 111 identified in the IoT discovery campaign 122. For example, the management service 120 can place the IoT capability discovery command in the command queues for the subset of the gateways 111, and can transmit the IoT capability discovery command on check in by the gateways 111. The IoT capability discovery command can instruct the gateway 111 to identify IoT capabilities 178 of IoT devices 113 connected to the gateway 111, for example, on a particular subnetwork. The IoT capability discovery command can include instructions for the gateway 111 to transmit an IoT capability discovery message, generate a list of IoT capabilities, and transmit the list of IoT capabilities to the management service 120. The IoT capability discovery command can include an IoT type 176, and the list of IoT capabilities can be IoT capabilities corresponding to IoT devices 113 of a particular IoT type 176. The gateway 111 can then transmit a list of IoT device capabilities to the management service 120.

In step 315, the management service 120 can create an IoT template 124. The management service can automatically generate the IoT template 124 for an IoT type 176 based on the IoT capabilities 178 of the IoT type 176. The IoT template 124 can also indicate an IoT protocol. The IoT template 124 for an IoT type 176 can initially include a predetermined metric collection schedule or period, generally associated with the collection of any metric. However, a user can enter or select a desired schedule or period for each capability, including each metric collectable and each action performable by the IoT type 176. The capabilities included in the IoT template 124 can be the verified capabilities in the verified list of IoT capabilities 178. The IoT template 124 can be transmitted to the gateway 111 that has IoT devices 113 of that IoT type 176 connected. In this way, the gateway 111 can automatically instruct corresponding IoT devices 113 to implement behaviors according to the IoT template 124.

In step 318, the management service 120 can transmit an IoT device discovery command to the subset of the gateways 111 identified in the IoT discovery campaign 122. For example, the management service 120 can place the IoT device discovery command in the command queues for the subset of the gateways 111, and can transmit the IoT device discovery command on check in by the gateways 111. The IoT device discovery command can instruct the gateway 111 to identify IoT devices 113 connected to the gateway 111, for example, on a particular subnetwork. Each IoT device 113 can be identified according to a unique IoT device identifier 173. The gateway 111 can perform the IoT device discovery command and return a list of IoT devices to the management service 120.

In step 321, the management service 120 can transmit an IoT device enrollment command to the gateway 111. The user interface of the management service 120 can display a user interface that shows a sortable list of IoT devices 113, which includes and can be sorted according to IoT device name, IoT type 176, IoT template 124, enrollment status, and IoT device identifier 173. The IoT device name can be automatically generated based on the IoT protocol of the IoT device 113, IoT device category associated with its IoT type 176, and the IoT device identifier 173 of the IoT device 113. The automatically generated IoT device name can include a character string that identifies the IoT protocol, a character string associated with the IoT device category, and the IoT device identifier 173, separated by spaces, underscores, dashes, pikes, or another predetermined separation character. The respective character strings can be full or shortened versions of the IoT protocol, IoT device category, and the IoT device identifier 173. The IoT device name can be manually changed or updated through the user interface. The IoT type 176 can be represented by a character string that includes a full or shortened version of the vendor identifier, and a character string that includes a full or shortened version of the model identifier, separated by a separation character. The IoT template 124 can be represented by a character string that identifies the IoT protocol, a character string that identifies the IoT device category, and a template type identifier.

The user interface of the management service 120 can also include a user interface element to select an IoT device 113, and a user interface element that when activated, enrolls the IoT device 113 with the management service 120. For example, the management service 120 can, in response to activation of an enrollment interface element, transmit the IoT device enrollment command to the gateway 111 through which the selected IoT device 113 is connected. In some examples, the enrollment command registers, in the gateway 111, permission for the gateway 111 to forward packets or other data from the IoT device 113 to a particular network address of the datacenter 106 or the management system 103. In other cases, the enrollment command permits the gateway 111 to allow packets or other data from the IoT device 113 to reach a wide area network or the internet. The enrollment command can also include an enrollment policy implemented by the gateway management agent 154 for communications with the IoT device 113.

Figure 4:
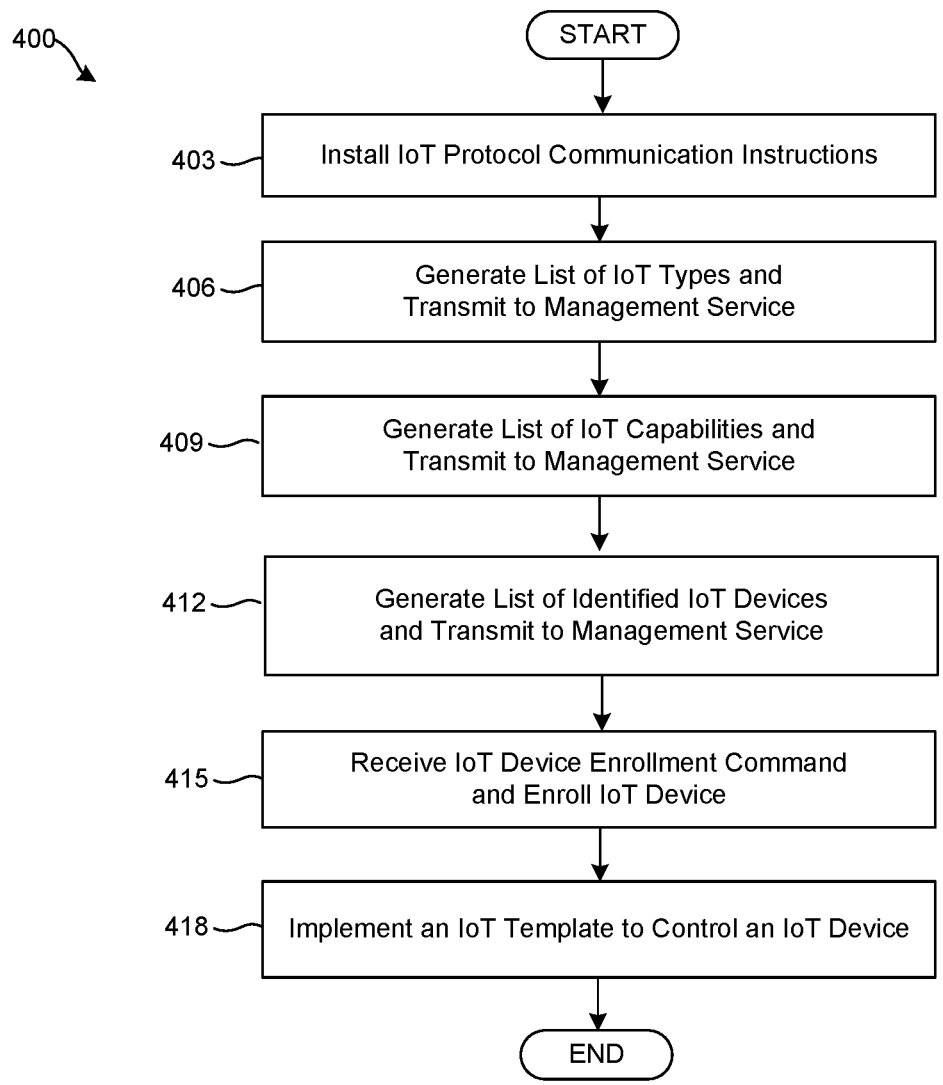
FIG. 4 is a flowchart illustrating functionality implemented by components of the networked environment.

FIG. 4 shows a flowchart 400 that illustrates an example of the operation of the gateway management agent 154. Flowchart 400 illustrates how the gateway management agent 154 coordinates with the management service 120 and IoT devices 113 for discovery, configuration, and enrollment of IoT devices 113 connected to the gateway 111.

In step 403, the gateway management agent 154 can install IoT protocol communication instructions 155 to a gateway 111. For example, the gateway management agent 154 can check in with the management service 120 and retrieve, from a command queue maintained for the gateway 111 by the management service 120, a command to install IoT protocol communication instructions 155 to the gateway 111. The IoT protocol communication instructions 155 can enable to the gateways 111 to communicate using the IoT protocol specified by the IoT discovery campaign 122.

In step 406, the gateway management agent 154 can generate a list of IoT types and transmit the IoT type list to the management service 120. The gateway management agent 154 can check in with the management service 120 and retrieve, from the command queue, an IoT type discovery command. The gateway management agent 154 can, based on the IoT type of discovery command, broadcast a message in an IoT protocol specified in the IoT type discovery command. The broadcast message can be an IoT type discovery message or another message that the IoT devices 113 respond to by providing their IoT capabilities 178. The IoT type 176 can include a vendor identifier and a model identifier of the IoT device 113. In some examples, the IoT device 113 provides additional information in response to the broadcast message. The IoT type discovery command can cause the gateway management agent 154 to generate a list, table, or other data structure that includes the IoT types 176 of IoT devices 113 of a subnetwork connected to the gateway 111. The gateway management agent 154 can transmit the list of IoT types 176 to the management service 120.

In step 409, the gateway management agent 154 can generate a list of IoT device capabilities and transmit the capabilities list to the management service 120. The gateway management agent 154 can check in with the management service 120 and retrieve, from the command queue, an IoT capability discovery command. The gateway management agent 154 can, based on the IoT capability discovery command, broadcast a message in an IoT protocol specified in the IoT type discovery command. The broadcast message can be an IoT capability discovery message that the IoT devices 113 respond to by providing their IoT capabilities 178. In some examples, the IoT device 113 provides additional information in response to the broadcast message. The IoT capabilities 178 can include a list of capabilities corresponding to the IoT type 176. In some examples, rather than a broadcast message, the gateway management agent 154 can identify connected IoT devices 113 that correspond to an IoT type 176 or IoT template 124 specified in the IoT capability discovery command, and can transmit individual IoT capability requests to these IoT devices 113 using the IoT protocol communication instructions 155 for a particular IoT protocol. The IoT devices 113 can respond by transmitting their IoT capabilities 178 to the gateway 111. The IoT capability discovery command can cause the gateway management agent 154 to generate a list, table, or other data structure that includes the IoT capabilities 178 of IoT devices 113 of a subnetwork connected to the gateway 111. The gateway management agent 154 can transmit the list of IoT capabilities 178 to the management service 120.

The gateway management agent 154 can also verify that each capability in the list of IoT capabilities 178 can be actually supported by the IoT device 113 or IoT type 176. The gateway management agent 154 can command or request an IoT device 113 to perform a particular capability. In other words, the gateway management agent 154 can command or request an IoT device 113 to provide the metric or perform an action. If the IoT device 113 successfully transmits the metric to the gateway 111, or successfully performs the action, then the corresponding capability can remain in the list of IoT capabilities 178, or can be flagged as verified. However, if the IoT device 113 fails to transmit the metric to the gateway 111, or fails to perform the action, then the corresponding capability can be filtered or removed from the list of IoT capabilities 178 or can be flagged as ineffective in the list of IoT capabilities 178. The resulting list can be considered a verified list of IoT capabilities 178. The gateway management agent 154 can transmit the verified list of IoT capabilities 178 to the management service 120.

In step 412, the gateway management agent 154 can generate a list of IoT devices and transmit the device list to the management service 120. The gateway management agent 154 can check in with the management service 120 and retrieve, from the command queue, an IoT device discovery command. The gateway management agent 154 can, based on the IoT device discovery command, broadcast a message in an IoT protocol specified in the IoT device discovery command. The broadcast message can be an IoT device discovery message that the IoT devices 113 respond to by providing their IoT device identifiers 173. In some examples, the IoT device 113 provides additional information in response to the broadcast message. In some examples, rather than a broadcast message, the gateway management agent 154 can identify connected IoT devices 113 that correspond to an IoT type 176 or IoT template 124 specified in the IoT device discovery command, and transmit individual IoT capability requests to these IoT devices 113 using the IoT protocol communication instructions 155 for a particular IoT protocol. The IoT devices 113 can respond by transmitting their IoT device identifiers 173 to the gateway 111. The IoT device discovery command can cause the gateway management agent 154 to generate a list, table, or other data structure that includes the IoT device identifiers 173 of IoT devices 113 of a subnetwork connected to the gateway 111. The gateway management agent 154 can transmit the list of IoT device identifiers 173 to the management service 120.

In step 415, the gateway management agent 154 can receive an IoT device enrollment command from the management service 120. For example, the gateway management agent 154 can retrieve an IoT device enrollment command from the command queue. The gateway management agent 154 can register, in the data store 153, permission for the gateway 111 to forward packets or other data from the IoT device 113 to a particular network address of the datacenter 106 or the management system 103. In other cases, the enrollment command permits the gateway 111 to allow packets or other data from the IoT device 113 to reach a wide area network or the internet. The enrollment command can also include an enrollment policy implemented by the gateway management agent 154 for communications with the IoT device 113.

In step 418, the gateway management agent 154 can implement an IoT template 124 to control operation of the IoT device 113. The management service 120 can transmit the IoT template 124 to the gateway 111 based on the IoT types connected to the gateway 111. The gateway 111 can refer to the IoT template 124, and transmit a request for the metric periodically or on the specified schedule in order to retrieve the metric from the IoT device 113. In some cases, the gateway 111 can transmit the IoT instructions 144 to the IoT device 113 so that the IoT device 113 automatically provides the metric according to the specified period or schedule.

The IoT template 124 can also specify IoT instructions 144 to perform a particular action periodically or based on a specified schedule. The gateway 111 can refer to the IoT template 124, and transmit a request or command for the IoT device 113 to perform the action periodically or on the specified schedule. In some cases, the gateway 111 can transmit IoT instructions 144 to the IoT device 113 so that the IoT device 113 automatically performs the action periodically or based on a specified schedule.

Figure 5:
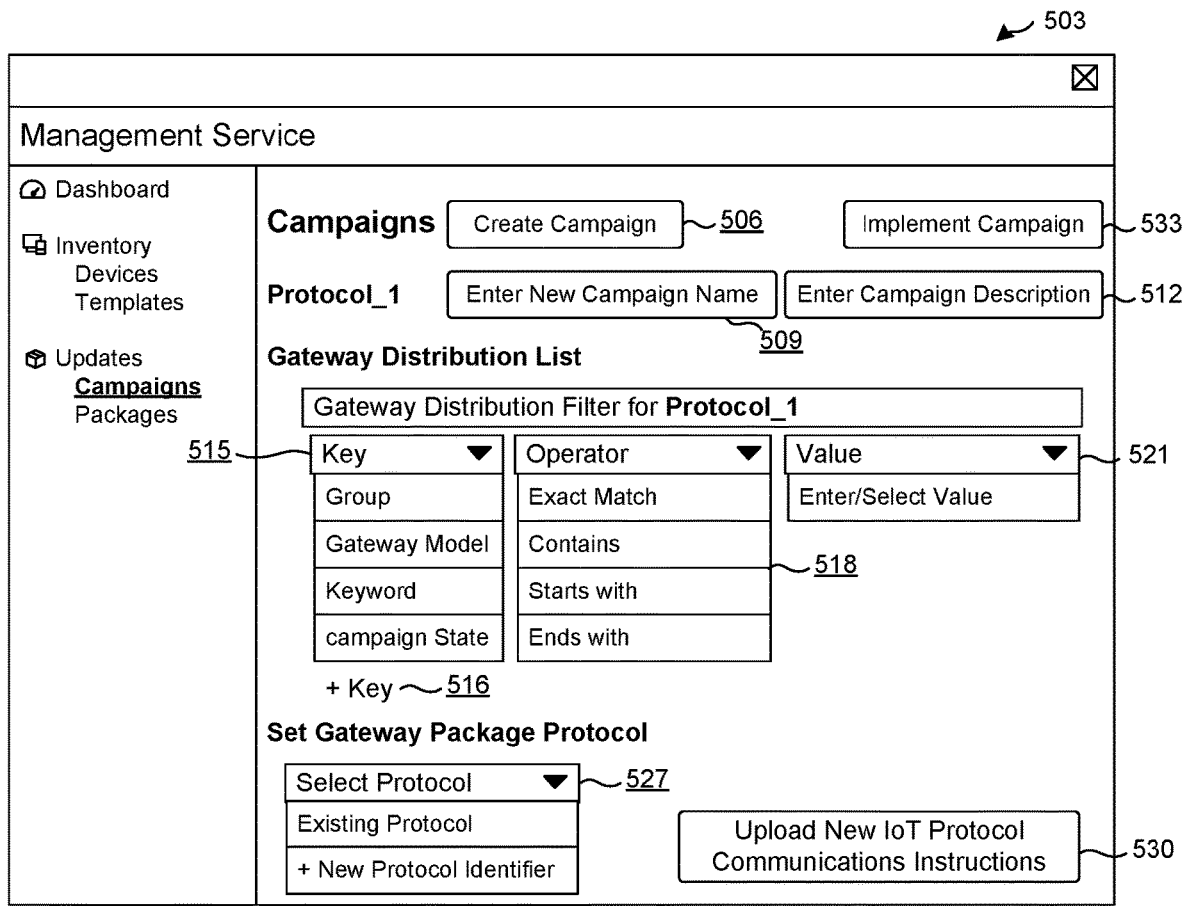
FIG. 5 is a drawing illustrating functionality implemented by components of the networked environment and rendered for display.

FIG. 5 is a drawing that illustrates a graphical user interface 503 generated by the management service 120 and rendered for display. The management service 120 can generate a user interface 503 for access through a display of the management system 103 or can generate the user interface 503 for access over the network 112 using a client device 109.

The user interface 503 can enable a user to design an IoT discovery campaign 122. The user interface 503 can include a user interface element 506 that initiates creation of a new IoT discovery campaign 122 by generating a new set of user interface elements for a new IoT discovery campaign 122. The user interface 503 can include a user interface element 509, through which a name or identifier of the IoT discovery campaign 122 can be entered. The user interface 503 can also include a user interface element 512, through which a description of the IoT discovery campaign 122 can be entered.

The user interface 503 can include a set of user interface elements that enable a user to filter the gateways 111 based on a key value pair and an operator. A user interface element 515 can include a drop down menu with a list of keys or parameter types that can be used to filter the gateways 111. A user interface element 516, when selected, can allow a user to define and add a new key. A user interface element 518 can include a drop down menu with a list of operators. A user interface element 521 can allow a user to enter or select a value to filter the gateways 111.

The user interface 503 can also include a user interface element 527 to select or enter an IoT protocol for the IoT discovery campaign 122. The user interface 503 can also provide a user interface element through which a new IoT protocol identifier for an IoT protocol can be entered. The user interface 503 can also include a user interface element 530, through which new IoT protocol communication instructions 155 can be uploaded, or a URL or other network address for the new IoT protocol communication instructions 155 can be provided for the IoT discovery campaign 122. The user interface 503 can also include a user interface element 533 that causes the IoT discovery campaign 122 to be implemented using the parameters defined through the user interface 503.

Figure 6:
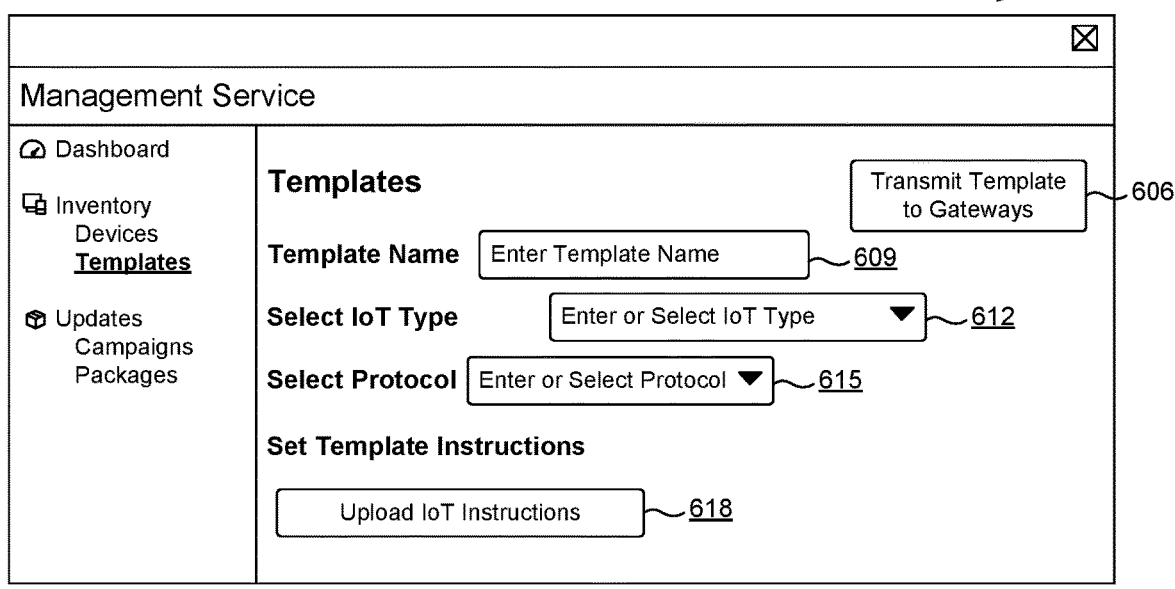
FIG. 6 is a drawing illustrating functionality implemented by components of the networked environment and rendered for display.

FIG. 6 is a drawing that illustrates a graphical user interface 603 generated by the management service 120 and rendered for display. The user interface 603 can be used to design or customize an IoT template 124. The user interface 603 can include a user interface element 606. When selected, the user interface element 606 can transmit the IoT template 124 to a selected subset of the gateways 111. The user interface 603 can include a user interface element 609, through which a template name or identifier of the IoT template 124 can be entered. The user interface 603 can include a user interface element 612, through which an IoT type 176 for the IoT template 124 can be entered or selected. The user interface 603 can include a user interface element 615, through which an IoT protocol can be entered or selected. The user interface 603 can include a user interface element 618. When selected, the user interface element 618 can enable the upload of IoT instructions 144 that define custom operations of the IoT devices 113.

Figure 7:
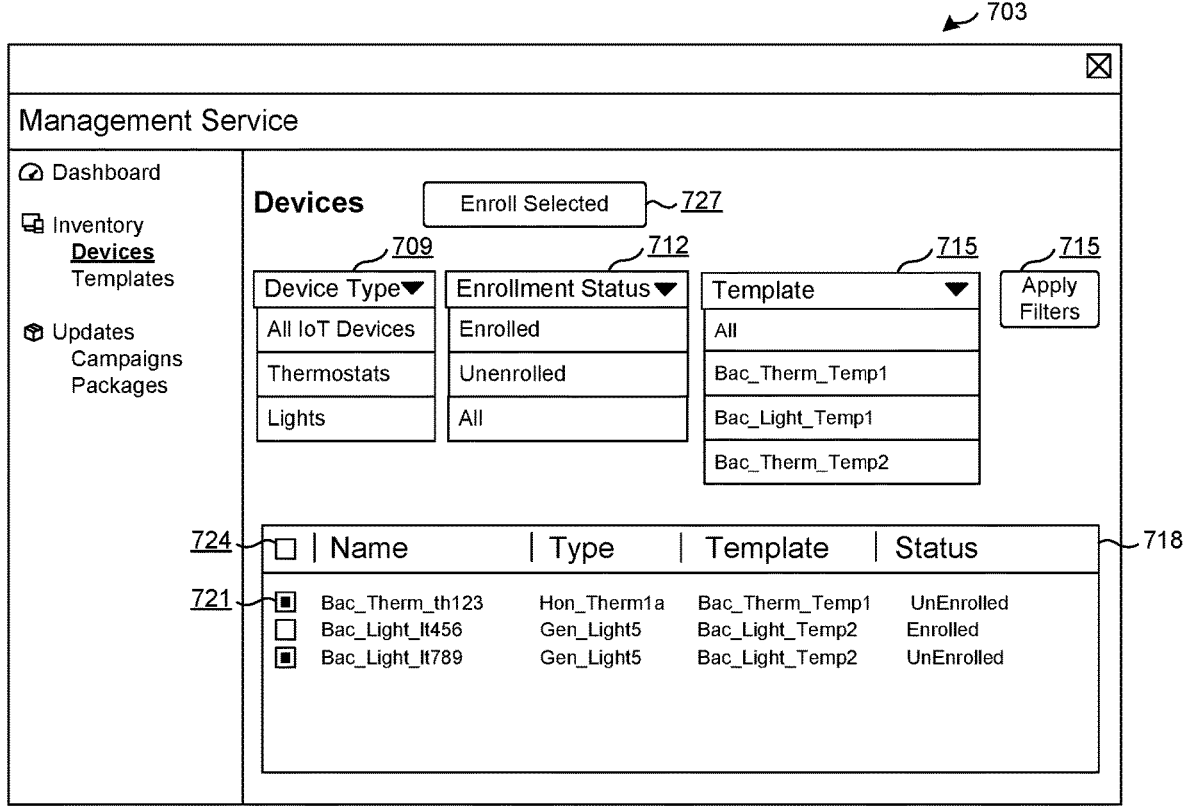
FIG. 7 is a drawing illustrating functionality implemented by components of the networked environment and rendered for display.

FIG. 7 is a drawing that illustrates a graphical user interface 703 generated by the management service 120 and rendered for display. The user interface 703 can be utilized to view IoT devices 113 in one or more list of IoT devices 113 received from the gateways 111. The user interface 703 can provide user interface elements to filter or narrow down the IoT devices 113 that have been aggregated through the lists of IoT devices 113 from the gateways 111 based on the IoT discovery campaign 122. The management service 120 can keep discovered IoT devices 113 available for viewing and enrollment for a predetermined period of time. The user interface 703 can include a user interface element 709, through which a user can enter or select an IoT type 176 of IoT devices 113 to show in the user interface 703. The user interface 703 can include a user interface element 712, through which a user can enter or select enrollment status of IoT devices 113 to show in the user interface 703. The user interface 703 can include a user interface element 715, through which a user can enter or select a particular IoT template 124 associated with IoT devices 113 to show in user interface 703. The user interface 703 can include a user interface element 715 that when selected, applies the selected filter parameters for the discovered IoT devices 113. The user interface 703 can include a user interface area or section 718 that includes the discovered IoT devices 113, or a filtered set of the discovered IoT devices 113. The user interface 703 can include a user interface element 721 that can select a particular IoT device 113, and a user interface element 724 that selects all IoT devices 113 in the filtered (or unfiltered) set shown in section 718. The user interface element 727 can cause the management service 120 to enroll the selected IoT devices 113 with the management service 120.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The IoT devices 113, gateways 111, client devices 109, and devices including the management system 103 can include a display upon which user interfaces can be rendered. The IoT devices 113, gateways 111, client devices 109, and devices including the management system 103 can also include one or more input/output devices that can include, for example, a capacitive touchscreen or other type of touch input device, fingerprint reader, or keyboard.

Although the management service 120, gateway management agent 154, and other various services and functions described herein can be embodied in software or code executed by general purpose hardware as discussed above, as an alternative, the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show are examples of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram and flowcharts are show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the drawings can be skipped or omitted.

Also, any logic or application described herein that includes software or code can be embodied in any non-transitory computer-readable medium for use by or in connection with an instruction execution system such as a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described embodiments of the present disclosure are merely possible examples of Therefore, the following is claimed:

1. A system, comprising:
   at least one computing device comprising at least one processor; and
   a data store comprising executable instructions, wherein the instructions, when executed by the at least one processor, cause the at least one computing device to at least:
   receive, from a management service, by a gateway device that is enrolled with the management service, a transmission that specifies an IoT protocol, and instructions for the gateway device to broadcast an IoT device discovery message;
   broadcast, by the gateway device, the IoT device discovery beacon message so that the IoT device discovery beacon message is available to IoT devices that connect to the gateway device using the IoT protocol, wherein the IoT devices provide unique IoT device identifiers based at least in part on the IoT device discovery beacon message;
   transmit, from the respective gateway to the management service, a list of IoT devices comprising the unique IoT device identifiers; and
   execute, by the gateway device, a command to permit communications between the gateway device and the IoT devices.

2. The system of claim 1, wherein the instructions, when executed by the at least one processor, further cause the at least one computing device to at least:
   receive, by the gateway device, a command to install IoT protocol communication instructions on the gateway device; and
   install IoT protocol communication instructions on the gateway device.

3. The system of claim 1, wherein the instructions, when executed by the at least one processor, further cause the at least one computing device to at least:
   receive, from the management service by the gateway device, an IoT type discovery command, the IoT type discovery command comprising instructions for the gateway device to generate a list of IoT types corresponding to IoT devices connected to the gateway device.

4. The system of claim 3, wherein the instructions, when executed by the at least one processor, further cause the at least one computing device to at least:
   identify, based on the IoT type discovery command, an IoT type corresponding to a respective one of the IoT devices; and
   transmit, by the gateway device to the management service, a list of IoT types corresponding to the IoT devices, the list of IoT types being generated based on the IoT type corresponding to the respective one of the IoT devices.

5. The system of claim 1, wherein the instructions, when executed by the at least one processor, further cause the at least one computing device to at least:
   receive, from the management service by the gateway device, an IoT capability discovery command for a particular IoT type, the IoT capability discovery command comprising instructions for the gateway device to generate a list of IoT capabilities for the particular IoT type.

6. The system of claim 5, wherein the instructions, when executed by the at least one processor, further cause the at least one computing device to at least:
   identify, based on the IoT capability discovery command, at least one IoT capability of at least one IoT device corresponding to the particular IoT type; and
   transmit, by the gateway device to the management service, a list of IoT capabilities of the at least one IoT device corresponding to the particular IoT type, the list of IoT capabilities being generated based on the at least one IoT capability of the at least one IoT device corresponding to the particular IoT type.

7. The system of claim 6, wherein the instructions, when executed by the at least one processor, further cause the at least one computing device to at least:
   receive, from the management service by the gateway device, IoT instructions that cause an IoT device of the IoT type to perform an IoT capability according to a schedule; and
   transmit, by the gateway device to the IoT device, the IoT instructions that cause the IoT device to perform the IoT capability according to the schedule.

8. A non-transitory computer-readable medium comprising executable instructions, wherein the instructions, when executed by at least one processor, cause at least one computing device to at least:
   receive, from a management service, by a gateway device that is enrolled with the management service, a transmission that specifies an IoT protocol, and instructions for the gateway device to broadcast an IoT device discovery message;
   broadcast, by the gateway device, the IoT device discovery beacon message so that the IoT device discovery beacon message is available to IoT devices that connect to the gateway device using the IoT protocol, wherein the IoT devices provide unique IoT device identifiers based at least in part on the IoT device discovery beacon message;
   transmit, from the respective gateway to the management service, a list of IoT devices comprising the unique IoT device identifiers; and
   execute, by the gateway device, a command to permit communications between the gateway device and the IoT devices.

9. The non-transitory computer-readable medium of claim 8, wherein the instructions, when executed by the at least one processor, further cause the at least one computing device to at least:
   receive, by the gateway device, a command to install IoT protocol communication instructions on the gateway device; and
   install IoT protocol communication instructions on the gateway device.

10. The non-transitory computer-readable medium of claim 8, wherein the instructions, when executed by the at least one processor, further cause the at least one computing device to at least:
    receive, from the management service by the gateway device, an IoT type discovery command, the IoT type discovery command comprising instructions for the gateway device to generate a list of IoT types corresponding to IoT devices connected to the gateway device.

11. The non-transitory computer-readable medium of claim 10, wherein the instructions, when executed by the at least one processor, further cause the at least one computing device to at least:
- identify, based on the IoT type discovery command, an IoT type corresponding to a respective one of the IoT devices; and
- transmit, by the gateway device to the management service, a list of IoT types corresponding to the IoT devices, the list of IoT types being generated based on the IoT type corresponding to the respective one of the IoT devices.

12. The non-transitory computer-readable medium of claim 8, wherein the instructions, when executed by the at least one processor, further cause the at least one computing device to at least:
- receive, from the management service by the gateway device, an IoT capability discovery command for a particular IoT type, the IoT capability discovery command comprising instructions for the gateway device to generate a list of IoT capabilities for the particular IoT type.

13. The non-transitory computer-readable medium of claim 12, wherein the instructions, when executed by the at least one processor, further cause the at least one computing device to at least:
- identify, based on the IoT capability discovery command, at least one IoT capability of at least one IoT device corresponding to the particular IoT type; and
- transmit, by the gateway device to the management service, a list of IoT capabilities of the at least one IoT device corresponding to the particular IoT type, the list of IoT capabilities being generated based on the at least one IoT capability of the at least one IoT device corresponding to the particular IoT type.

14. The non-transitory computer-readable medium of claim 8, wherein the instructions, when executed by the at least one processor, further cause the at least one computing device to at least:
- receive, from the management service by the gateway device, IoT instructions that cause an IoT device of the IoT type to perform an IoT capability according to a schedule; and
- transmit, by the gateway device to the IoT device, the IoT instructions that cause the IoT device to perform the IoT capability according to the schedule.

15. A method, comprising:
- receiving, from a management service, by a gateway device that is enrolled with the management service, a transmission that specifies an IoT protocol, and instructions for the gateway device to broadcast an IoT device discovery message;
- broadcasting, by the gateway device, the IoT device discovery beacon message so that the IoT device discovery beacon message is available to IoT devices that connect to the gateway device using the IoT protocol, wherein the IoT devices provide unique IoT device identifiers based at least in part on the IoT device discovery beacon message;
- transmitting, from the respective gateway to the management service, a list of IoT devices comprising the unique IoT device identifiers; and
- executing, by the gateway device, a command to permit communications between the gateway device and the IoT devices.

16. The method of claim 15, further comprising:
- receiving, by the gateway device, a command to install IoT protocol communication instructions on the gateway device; and
- installing IoT protocol communication instructions on the gateway device.

17. The method of claim 15, further comprising:
- receiving, from the management service by the gateway device, an IoT type discovery command, the IoT type discovery command comprising instructions for the gateway device to generate a list of IoT types corresponding to IoT devices connected to the gateway device.

18. The method of claim 17, further comprising:
- identifying, based on the IoT type discovery command, an IoT type corresponding to a respective one of the IoT devices; and
- transmitting, by the gateway device to the management service, a list of IoT types corresponding to the IoT devices, the list of IoT types being generated based on the IoT type corresponding to the respective one of the IoT devices.

19. The method of claim 15, further comprising:
- receiving, from the management service by the gateway device, an IoT capability discovery command for a particular IoT type, the IoT capability discovery command comprising instructions for the gateway device to generate a list of IoT capabilities for the particular IoT type.

20. The method of claim 15, further comprising:
- identifying, based on the IoT capability discovery command, at least one IoT capability of at least one IoT device corresponding to the particular IoT type; and
- transmitting, by the gateway device to the management service, a list of IoT capabilities of the at least one IoT device corresponding to the particular IoT type, the list of IoT capabilities being generated based on the at least one IoT capability of the at least one IoT device corresponding to the particular IoT type.

* * * * *